J. PEARSON.
SELF LOCKING NUT.
APPLICATION FILED MAY 13, 1907.
991,016.
Patented May 2, 1911.
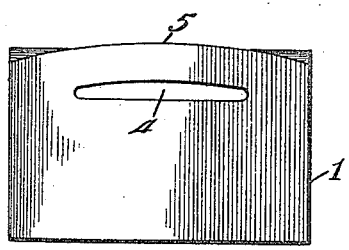
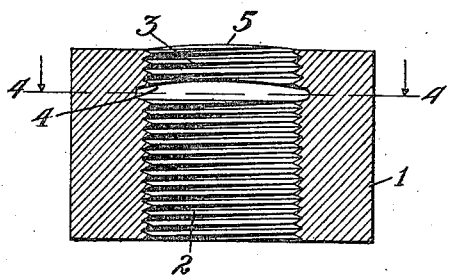  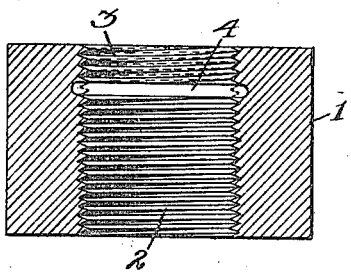
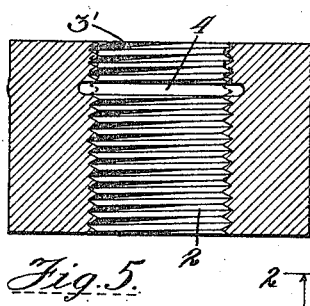  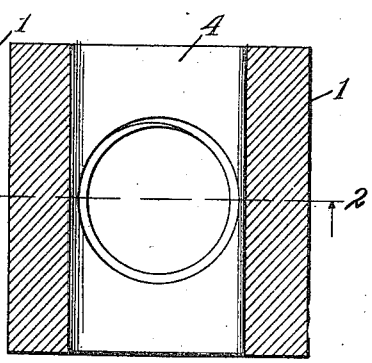
Witnesses:
Inventor:
John Pearson
By Hill & Hill
Attys

UNITED STATES PATENT OFFICE.

JOHN PEARSON, OF CHICAGO, ILLINOIS, ASSIGNOR TO GRIP NUT COMPANY, OF CHICAGO, ILLINOIS, A CORPORATION OF ILLINOIS.

SELF-LOCKING NUT.

991,016. Specification of Letters Patent. Patented May 2, 1911.

Application filed May 13, 1907. Serial No. 373,334.

*To all whom it may concern:*

Be it known that I, JOHN PEARSON, a citizen of the United States, residing at Chicago, county of Cook, and State of Illinois, have invented certain new and useful Improvements in Self-Locking Nuts, of which the following is a description.

My invention relates to that class of nuts provided with means for automatically engaging the bolt upon which they are mounted to prevent their accidental displacement when in use.

The object of my invention is to produce a simple, and efficient device of the kind described, and one which may be repeatedly used upon a bolt or the like without damage to the bolt or nut or without destroying its holding qualities.

To this end my invention consists in the novel construction, arrangement, and combination of parts herein shown and described, and more particularly, pointed out in the claim.

In the accompanying drawings wherein like or similar reference characters indicate like or corresponding parts; Figure 1 is a side elevation of a nut blank for forming my improved nut lock. Fig. 2 is a central vertical section of the same threaded. Fig. 3 is a section similar to that shown in Fig. 2, but showing the finished nut. Fig. 4 is a section taken substantially on line 4—4 of Fig. 2. Fig. 5 is a section similar to Fig. 3 showing a slightly modified form of my device.

In the preferred form shown in the drawings, my device comprises a threaded nut 1 of the usual or any preferred form in which the wall of the threaded opening is divided into two sections, comprising a holding or normal section 2 and a locking section 3. The nut 1 is preferably formed integral with the adjacent parts of the sections 2 and 3 slightly separated to insure an absolutely free action of the locking portion and also to facilitate the manufacture of the nut.

The division between the sections of the nut may be secured in any desired manner. As shown a slot 4 slightly wider than the opening in the nut-blank is formed through the nut-blank near the back of the nut substantially parallel to the nut face, cutting the central opening at substantially right angles and preferably extending an equal distance each side of the threaded opening.

The nut blank thus formed is threaded in the usual manner or any desired manner after which the threads of the locking section 3 are slightly bent or otherwise uniformly displaced from their normal position longitudinally of the opening so that when a bolt having normal threads is inserted in the nut the threads of the section 3 owing to their longitudinal distortion will grip the threads of the bolt and tend to prevent accidental displacement or movement between the bolt and nut.

The displacement of the threads of the part 3 may be produced in any desired manner. In the form shown in Figs. 1, 2 and 3 the slot 4 is formed slightly higher at its center, and a swell or projection 5 is provided at the back of the nut and extending parallel with the slot as shown in Fig. 2. After the blank is threaded sufficient pressure is applied to the projection 5 at one or both sides of the threaded opening to permanently bend the same toward the nut partially closing the slot, leaving the back face of the nut flat as shown in Fig. 3, and bending all the threads of the section 3 from their normal or original form longitudinally of the threaded opening, as shown by the broken lines in Fig. 3, which indicate the original form of the threads in this part.

In Fig. 5 the nut is formed as before described except that the projection 5 may be omitted and the slot 4 may be of uniform height. To displace the threads of the locking portion in this form pressure is applied upon the edges of the nut to upset the material at one or both edges of the slot 4 thus slightly decreasing the height of the slot either uniformly or at one edge as the case may be and slightly displacing the threads of the locking portion of the nut so that when a bolt is inserted through the part 2 into the part 3' the threads of the two parts of the nut will coöperate to lock the bolt from movement in the nut.

While in the foregoing description in each form I have referred to the displacement of the part 3 toward the part 2 it is obvious that a displacement in the opposite direction would operate in a very similar manner although such a displacement is probably slightly more difficult to secure. Obviously this and other slight modifications may be made in my device without departing from the spirit of my invention, hence I do not wish to be understood as limiting myself to the exact form and construction shown.

What I claim as new, and desire to secure by Letters Patent is:—

A nut comprising a body part with an annular threaded opening, the body part having a transversely extending opening of a width slightly in excess of the width of the threaded opening and separating the nut into a holding part and a locking part, the wall of the annular threaded opening being otherwise continuous, the threads of the holding part being continuous and uninterrupted and a portion of each of the threads of the locking part being distorted whereby the pitch of the successive threads of the locking part along any one line of its opening are uniform all along said line but vary from the normal pitch at one line of said opening.

In testimony whereof, I have hereunto signed my name in the presence of two subscribing witnesses.

JOHN PEARSON.

Witnesses:
BURTON U. HILLS,
CHARLES I. COBB.